United States Patent [19]
Vitter et al.

[11] Patent Number: 5,485,609
[45] Date of Patent: Jan. 16, 1996

[54] ONLINE BACKGROUND PREDICTORS AND PREFETCHERS FOR LOCALITY MANAGEMENT

[75] Inventors: Jeffrey S. Vitter, Durham, N.C.; Kenneth M. Curewitz, Milford, Mass.; P. Krishnan, Durham, N.C.

[73] Assignee: Brown University Research Foundation, Providence, R.I.

[21] Appl. No.: 246,600

[22] Filed: May 20, 1994

[51] Int. Cl.$^6$ .................................................. G06F 17/30
[52] U.S. Cl. ....................... 395/600; 395/460; 395/464
[58] Field of Search ................................. 395/325, 425, 395/600

[56] References Cited

U.S. PATENT DOCUMENTS

| | | | |
|---|---|---|---|
| 4,860,197 | 8/1989 | Langendorf | 395/375 |
| 4,980,823 | 12/1990 | Liu | 395/425 |
| 5,305,389 | 4/1994 | Palmer | 382/1 |
| 5,305,389 | 4/1994 | Palmer | 382/1 |

OTHER PUBLICATIONS

J. S. Vitter & P. Krishnan "Optimal Prefetching via Data Compression" Foundations of Computer Science, 32nd Annual Symposium, IEEE, pp. 121–130, 1991.

"Discrete Sequence Prediction and its Applications", Philip Laird, AI Research Branch, NASA Ames Research Center, Moffett Field, California, Sep. 1992, pp. 1 through 25.

"A Multi-Threaded Architecture for Prefetching in Object Bases", Carsten A. Gerlhof and Alfons Kemper, Universität, Passau, Passau, Germany, Jun. 21, 1993, pp. 1 through 23.

"Adaptive Prefetching for Disk Buffers", Kenneth Salem, Department of Computer Science, University of Maryland, College Park, Maryland, and CESDIS, NASA Goddard Space Flight Center, Code 930.5, Greenbelt, Maryland, Jan. 1991, pp. 1 through 21.

"Probablistic Diagnosis of Hot Spots", Kenneth Salem and Daniel Barbará & Richard J. Lipton, MITL (Matsushita Information Technology Laboratory), May 27, 1992, pp. 30 through 39.

"Universal Predictinof Individual Sequences", Meir Feder, Neri Merhav and Michael Gutman, IEEE Transactions On Informaiton Theory, vol. 38, No. 4, Jul. 1992, pp. 1258 through 1270.

"Predictive Caching", Mark L. Palmer and Stanley B. Zdonik, Department of Computer Science, Brown University, Providence, Rhode Island, Technical Report No. CS-90-29, Nov. 1990, pp. 1 through 30.

"Fido: A Cache That Lerans to Fetch", Mark Palmer, Stanley B. Zdonik, Proceedings of the 17th International Conference on Very Large Data Bases, Barcelona, Sep. 1991, pp. 225 through 264.

"Page Prefetching Based on Fault History", Inshik Song and Yookum Cho., Dept. of Computer Engineering, Seoul National University, USENIX Association, Mach III Symposium, pp. 203 through 213.

"Detection and Exploitation of File Working Sets", Carl D. Tait and Dan Duchamp, Computer Science Department, Columbia, University, New York, New York, IEEE, 1991, pp. 2 through 9.

"Intelligent Caching for Remote File Service", Kim Korner, Computer Science Department, University of Southern California, Los Angeles, California, pp. 220 through 226.

"Practical Prefetching Techniques for Multiprocessor File Systems", David Kotz, Dept. of Math and Computer Science, Dartmouth College, Hanover, N.H. and Carla Schlatter (List continued on next page.)

*Primary Examiner*—Paul V. Kulik
*Assistant Examiner*—Peter Y. Wang
*Attorney, Agent, or Firm*—Nixon & Vanderhye

[57] ABSTRACT

Online prediction techniques based on data compression principles are employed to make predictions in restricted memory environments. Predictors have data structures in the form of trees that are paged and maintained in a cache on a least recently used replacement basis. A fast sequence of events strategy increments the counts for events at the current node of the predictor.

10 Claims, 3 Drawing Sheets

OTHER PUBLICATIONS

Ellis, Dept. of Computer Science, Duke University, Durham, N.C., May 20, 1992, To appear in the Journal *Distributed and Parallel Databases,* pp. 1 through 24.

"Prefetching in File Systems for MIMD Multiprocessors", David F. Kotz and Carla Schlatter Ellis, reprinted from IEEE Transactions On Parallel And Distributed Systems, vol. 1, No. 2, Apr. 1990, pp. 218 through 230.

ONLINE BACKGROUND PREDICTORS AND PREFETCHERS FOR LOCALITY MANAGEMENT

The U.S. Government has a paid-up license in this invention and the right in limited circumstances to require the patent owner to license others on reasonable terms as provided for by the terms of Grant No. N00014-91-J-4052 awarded by ARPA, Grant No. F49620-92-J-0515 awarded by AFOSR and Grant No. CCR-9007851 awarded by NSF.

FIELD OF THE INVENTION

The field in which the invention resides is online predictors using data compression principles, with particular application for prefetching data into cache.

BACKGROUND

Object oriented data base applications and hypertext systems users spend a significant amount of time processing a page, and the computer and I/O system are essentially idle during that period. If the computer system can predict which page the user will request next, it can fetch that page into cache if it is not already in cache before the user asks for it. Thus, when the user actually asks for the page, the page is available instantaneously, and the user perceives a faster response time. This method of anticipating and getting pages into cache in the background is called prefetching.

Database systems that perform prefetching using techniques derived from older virtual memory systems have I/O limitations that seriously impede performance in large scale databases. This has led to improved algorithms for prefetching, such as the pattern matching approach in U.S. Pat. No. 5,305,389 issued to Palmer (1994), first-order statistics by Salem, "Adaptive Prefetching for Disk Buffers," CESDIS, Goddard Space Flight Center, TR-91-64, (January 1991), and a growing order Markov predictor used by Laird, "Discrete Sequence Prediction and its Applications," AI Research Branch, NASA Research Center, (1992).

Data compression techniques used for predicting are discussed in several publications by the inventors. See "Optimal Prefetching via Data Compression," Brown University Tech Report No. CS-91-46, (1991), "Practical Prefetching via Data Compression," Proceeding of the ACM SIGMOD '93 Conference, (May 26-28, 1993), and "Optimal Prediction for Prefetching in the Worst Case," Duke University Technical Report CS-1993-26, (October 1993). The intuition is that data compressors typically operate by postulating a dynamic probability distribution on the data to be compressed. If a data compressor successfully compresses the data, then its probability distribution on the data must be realistic and can be used for effective prediction.

The process of converting character-based data compressors to pure prefetchers is relatively simple. However, there are practical issues in prefetching, in particular time and memory restrictions that have to be considered, which are not as significant in data compression.

BRIEF DESCRIPTION OF THE INVENTION

The present invention relates to online prediction using data compression techniques. Modifications made to the prediction component allow its use in restricted memory conditions and situations where there may not be sufficient time to make predictions or update the data structure of the predictors. The invention has particular application to prefetching in cache memories. The predictor or prefetcher is in the form of a paged data structure.

DETAILED DESCRIPTION OF THE INVENTION

Online prediction entails the use of an algorithm that makes predictions based only on past history and other information available at the time. Offline prediction algorithms are based on knowledge of future requests and therefore never fault.

Data compression algorithms may be used to predict events. Three simple, deterministic algorithms useful for predicting are the Lempel-Ziv algorithm (LZ), the prediction by partial match algorithm (PPM), and the First-order Markov algorithm (FOM). In each, the predictor makes k possible predictions for the next event, ordered by their relative merit. To make these predictions the algorithms use $O(k)$ time, the average time to determine which k events to predict.

The LZ algorithm used is based on the character-based version E of the LZ algorithm for data compression. An encoder breaks or parses the input event string into distinct substrings in a greedy fashion. The character based LZ algorithm E builds in an online fashion a probabilistic model that feeds probability information to an arithmetic encoder. The following example shows how the probabilistic model is built.

Figure 1:
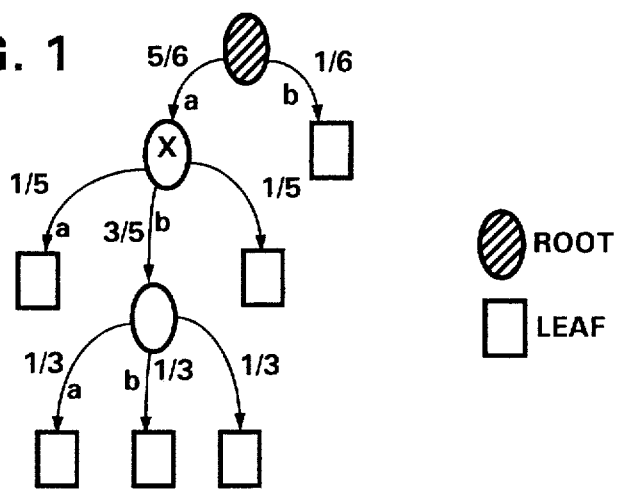
FIG. 1 shows a parse tree constructed by the character-based encoder E.

Assume for simplicity an alphabet (i.e., the set of possible events) of {a,b}. Next, consider the event sequence "aaaababaabbbabaa..." which the Lempel-Ziv encoder parses as "(a)(aa)(ab)(aba)(abb)(b)(abaa)..." In the character-based version of E of the Lempel-Ziv encoder, a probabilistic model (or parse tree) is built for each substring when the previous substring ends. The parse tree at the start of the seventh substring is pictured in FIG. 1. There are five previous substrings beginning with an "a" and one beginning with a "b". The event "a" is therefore assigned a probability $\frac{5}{6}$ at the root, and "b" is assigned a probability of $\frac{1}{6}$ at the root. Similarly, of the five substrings that begin with an "a", one begins with an "aa" and three begin with an "ab", accounting for the probabilities of $\frac{1}{5}$ for "a" and $\frac{3}{5}$ for "b" at node x, and so on.

The predictor LZ uses the probabilistic model built by the encoder E as follows. At the start of each substring, LZ's current node is set to be the root of E's parse tree. Before each event, LZ predicts the next event, with the top k estimated probabilities as specified by the transitions out of its current node. On seeing the actual event, LZ resets its current node by walking down the transition labeled by that event, and prepares to predict again. Employing a technique that parallels the Welsh implementation of the LZ data compressor, when LZ sees a leaf it resets its current node to be the root, and updates the transition count for both the leaf node and the root. This step is a modification that improves, by going to the root one step early, the performance of the LZ data compressor, which otherwise upon reaching a leaf fetches k events at random and then resets its current node to be the root.

The PPM algorithm is based on adapting for prediction the prediction by partial match data compressor. In practice, the PPM algorithm performs better for compression of text than the LZ algorithm. A jth-order Markov predictor on event sequence σ uses statistics of contexts of length j from the sequence to make its predictions for the next character. As for example:

Let j=2, and let the event sequence σ encountered so far be "abbababab." The next event is predicted based on the current context, that is, on the last j=2 events "ab" of σ. In σ, an "a" follows an "ab" twice, and a "b" follows an "ab" once. Hence "a" is predicted with a probability of ⅔, and "b" is predicted with a probability of ⅓. Note that if j=0, each event is predicted based on the relative number of times it appears in the access sequence.

A PPM predictor of order m maintains the jth-order Markov predictors on the event sequence seen till now for all $0 \leq j \leq m$. It predicts for the next event the k events with the maximum k probabilities giving preference to events predicted by higher order contexts. It executes the following loop:

$$\text{for } j = m \text{ down to } 0 \text{ do}$$
$$\text{begin}$$
$$t_j := \min(n_j, k - n_m - n_{m-1} - \ldots - n_{j+1});$$
$$t_j := \max(t_j, 0);$$
predict the events with the maximum $t_j$ probabilities
(that have not yet been predicted) as given by
the jth-order Markov predictor;
end where $n_j$ is the number of distinct events that have occurred previously for the current jth-order context.

The various jth-order Markov predictors, j=0,1 . . . ,m, can be represented and updated simultaneously in an efficient manner using a forward tree with vine pointers. The data structure is not quite a tree, since there can be more than one edge into a node because of vine pointers.

Updating the model can be done dynamically while the predictor traverses it. At the end of n events for some appropriately large n, or when the data structure attains a certain size; the predictor throws away the model and starts afresh.

The FOM algorithm is a limited memory predictor designed so it can always fit in a small amount of memory. It uses a parameter quantity w, the window size. With window size w, the algorithm maintains a first-order Markov predictor on the event sequence formed by the w events and predicts the k events with the maximum k probabilities as given by the first-order Markov predictor.

The data structures used for predicting are essentially trees. A tree is comprised of a root, nodes, leafs and transitions. The probability for each transition is proportional to an integer count of the number of times the transition is traversed. That is, in FIG. 1, at node x, counts 1, 3 and 1 are stored at the three transitions. As can be observed by viewing FIG. 2a, the data structure corresponds to the parse tree. In an LZ predictor there is at most one pointer into each node. Each node maintains information, counts, addresses, etc., about its children. This information is required to make predictions for the next event.

For caching, the data structure is paged. It is assumed that every node of the tree, except maybe the root, fits in one page of memory. Some of the nodes of the tree are maintained in cache using a well known heuristic such as the least recently used heuristic (LRU), where the item that has been used least recently is selected for eviction from cache. The root is always maintained in cache. Pages containing nodes not in cache are maintained in a larger secondary memory, e.g., a disk or even in a database. When such a node is required, it is paged or fetched into cache.

This arrangement works well where each node is given its own page, and at least two extra I/O operations can be performed between two accesses—to write out the evicted node and read in the desired node. A more space efficient arrangement is to compact several small nodes into a single page and to allocate only large nodes to a single page. Nodes would then be moved when they threaten to overflow a page. For a pure tree data structure as in LZ, nodes are allocated to less crowded pages in a lazy fashion, deferring reallocation until sufficient evidence exists that the probability of overflow is sufficiently high, using one extra I/O for the movement.

However, in PPM, the node of the data structure can have many (vine) pointers, and when a node moves it leaves back a forwarding address. Then, when a vine pointer is traversed, the forwarding address pointer is short circuited. In the worst case there may be one extra I/O per vine pointer per reallocation, although in practice there appear to be few reallocations and few short-circuiting of pointers. Simulations show that this technique significantly reduces paging for the data structure.

In an arrangement where the data structure is always in cache, or when events arrive so quickly that no I/O can be performed between them (fast events), the data structure can nevertheless be updated every time. The FOM data structure can always be updated since it is always in cache. However, if the data structure is paged, a sequence of fast events can force important sequence information to be disregarded.

To accommodate fast events, the counts for events in the fast sequence are incremented at the current node, the node used for prediction just before the sequence started. This is explained with respect to FIGS. 2a, 2b and 2c where the transition between the nodes is labeled with the event identifier and the reference count.

Figure 2A:
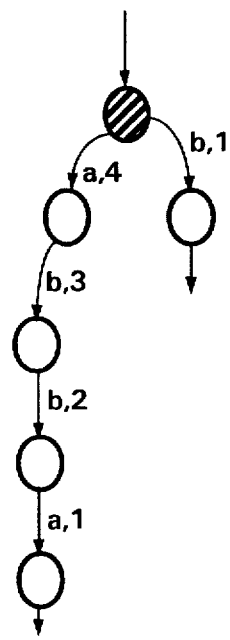
FIGS. 2a, 2b and 2c illustrate updating the data structure.
Figure 2B:
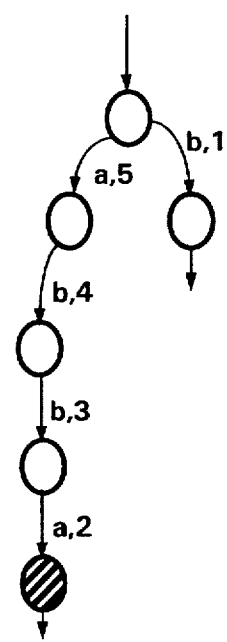

Consider a subsequence "abba . . . " of an event sequence. Let the relevant nodes in the subtree for the LZ data structure be as shown in FIG. 2a. If the subsequence of events is slow, i.e., if there is sufficient time to predict between accesses, the data structure would appear as in FIG. 2b after this subsequence.

Figure 2C:
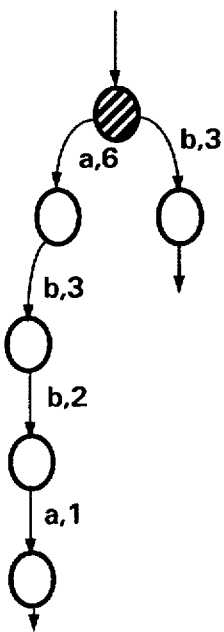

Consider now the case where the events in the subsequence are fast. The current node does not change during the subsequence of fast events. The reference counts for a and b are incremented at the current node, which is accessible to the predictor in memory (cache). By assumption, a node fits on a page, so no page faults are required to update the data structure. The updated data structure is shown in FIG. 2c.

Thus, if the sequence of fast events is context dependent, accumulating statistics at the current node will aid in prediction of correct events in the future before the start of a fast event subsequence. In this updating strategy, information is encapsulated at a node about not just the next event but a sequence of future fast events.

Figure 3:
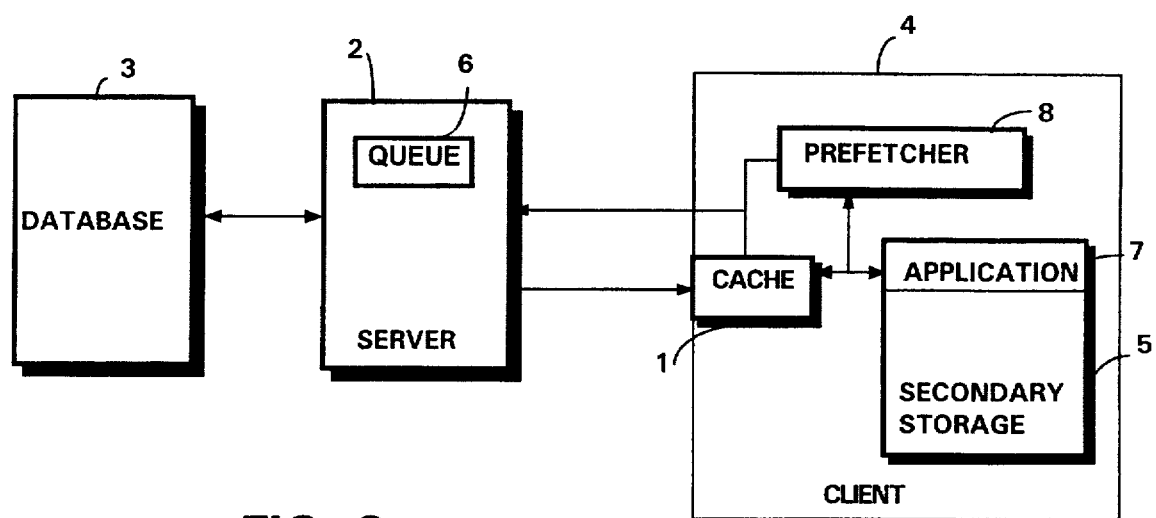
FIG. 3 is a block diagram of a system using a cache.

FIG. 3 illustrates the use of a cache 1 and a prefetcher 8 in a client-server environment. The server 2 manages a database 3 from which the client 4 makes requests for data. The client typically runs on a workstation with a modest amount of cache and local secondary storage 5. Secondary storage is used to store the local operating system, application programs and swap space. Data used by the application 7 must be in cache to be accessible. The server has the ability to handle demand read requests from the application and prefetch requests from the prefetcher. The server gives priority to the client's requests, flushing prefetch requests in its queue 6 when a demand request arrives. The prefetcher 8 is shown as a separate entity but may be a part of the application. Due to the diverse nature of a user's access patterns, an improvement in fault rate is best when an application runs a prefetcher which takes into account only the user's access sequence.

Figure 4:
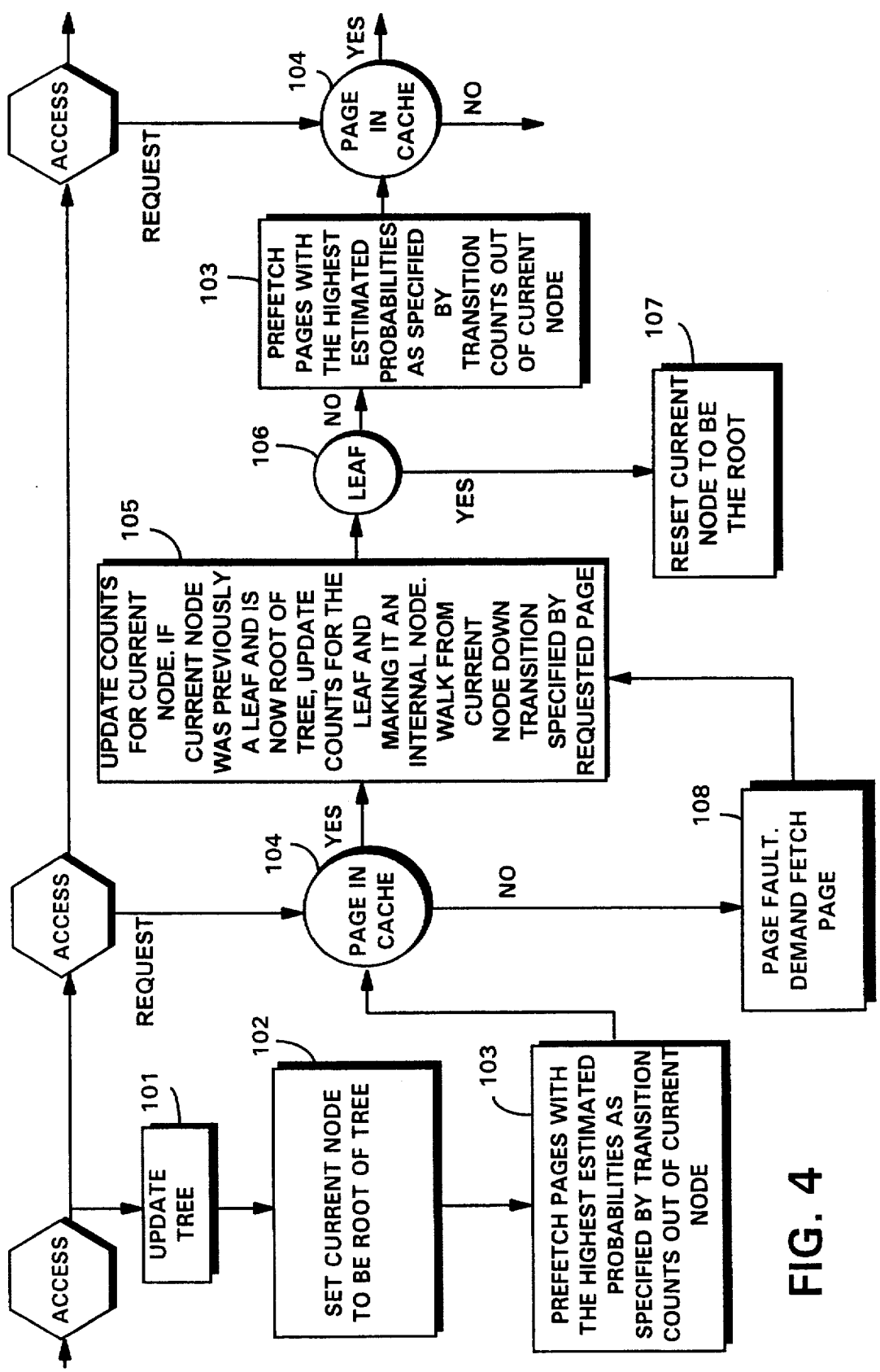
FIG. 4 is a flow diagram.

The prefetcher operates in accordance with the flow chart of FIG. 4. Subsequent to the last user page access and prior to the next user page access, the predictor is updated at 101 and at block 102 the prefetcher current node is set to be root of the predictor. The prefetcher at 103 prefetches user pages with the top k estimated probabilities as specified by the transitions out of the current node. The determination is then made as to whether a user page requested is in cache, block 104, and if the requested user page is not in cache a page fault is generated, block 108, and the requested user page is fetched into cache. Next, on seeing the actual user page requested, the prefetcher resets the current node by walking down the transition specified by the user page, block 105. Note also FIGS. 2a and 2b. At block 106 a determination is made as to whether the transition terminated in a leaf or led to a node. Where a node is reached the procedure of block 103 is repeated and preparation is made to prefetch again. Upon reaching a leaf, as indicated in block 107, the current node is reset to be the root, and the transition counts for both the former leaf node and the root are to be updated at the next update step. In this process, the former leaf node becomes an internal node, and new leaf nodes are created as its children. In the event of fast user page requests, prefetching is preempted, the counts for the predictor are updated at the current node, and the current node remains the same, as per FIG. 2c.

The pure prefetching assumption is that as many pages as desired, limited only by the size of the cache k, may be prefetched. The actual size of the cache is k+1 pages, since the page that the application is working on is not disturbed. In general, the time between user requests will not allow k prefetches at a time. Therefore, fewer than k pages are prefetched at a time. This leads to the use of a replacement strategy, i.e., which pages are to be replaced or evicted. The replacement strategy employed is a version of the well-known least recently used (LRU) heuristic. Prefetched pages are put into cache the same as if they were fetched on demand. They are marked as most recently used pages with the more probable pages marked as more recently used. Prefetched data pages replace the least recently used pages, which, if modified, are written back to disk.

Figure 5:
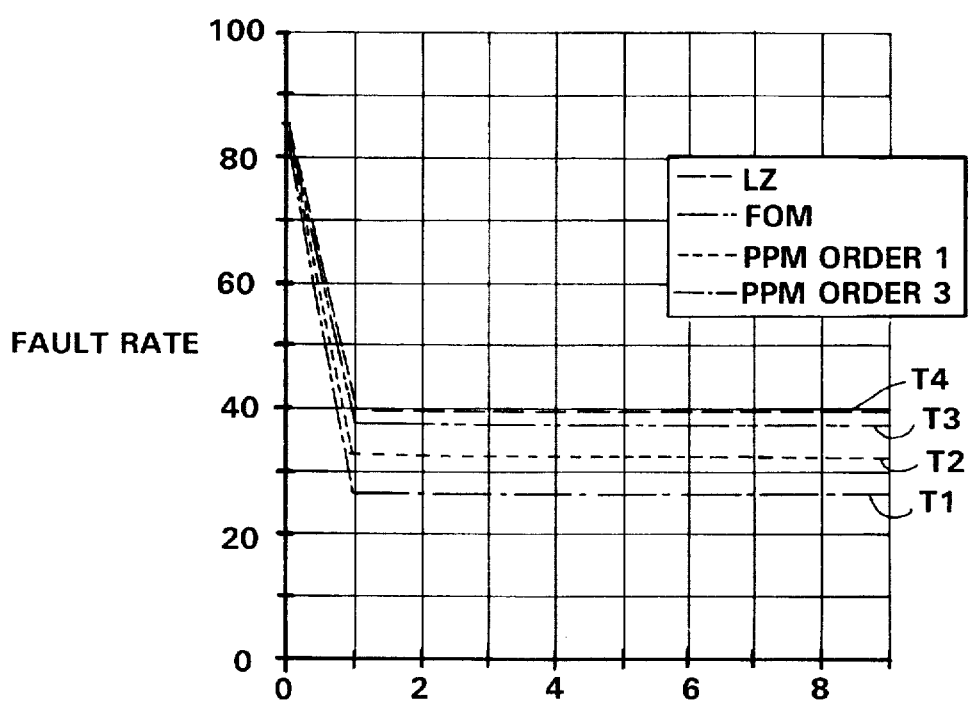
FIG. 5 is graph of fault rate vs. prefetch size.

Fetching into cache only when a fault occurs is called demand paging. In demand paging, a replacement strategy such as the LRU heuristic is frequently employed. A measure of effectiveness of the cache is the page fault rate, which is the number of page faults divided by the length of the access sequence. Using prefetching, the fault rate experienced by the application should decrease relative to the fault rate for a cache operating on demand paging with LRU replacement organization. In simulation with a CAD 1 trace, having 15,431 unique pages, 73,768 pages accessed, with LRU replacement, the fault rate is 85.3%. This is illustrated in FIG. 5, where the number of pages prefetched (prefetch size) is zero. With prefetching, for a cache size of k=10, the fault rate for the different prefetchers are less than 40%. The PPM order 3 prefetcher fault rate is 26.7%. In FIG. 5, T1 is for a PPM order 3 prefetcher, T2 is for a PPM order 1 prefetcher, T3 is for a FOM prefetcher and T4 is for a LZ prefetcher.

Another important way to achieve better response time is clustering. In clustering, related sets of objects are placed on the same page. Combining clustering with prefetching allows for improvements in response time performance.

The description in the environment of a client-server system is not limiting. Those of skill in the art will readily appreciate and understand the application of the techniques to other types of database management systems, multimedia applications, distributed applications, locality management for large scale computers and hierarchial computer memories. Moreover, for purposes of simplicity and ease of explanation a set of possible events comprising two events has been described. Those skilled in the art will understand that the total number of events, or number of pages in a database, will be much greater than two.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of maintaining a predictor or a prefetcher in cache comprising, constructing the predictor, using a sequence of recent user page requests and a data compression algorithm, in the form of a tree having a root, transitions, nodes and leaves, placing said root of the tree in a page and maintaining the page in cache, placing every node of the tree in at most one cache page, maintaining some of said node pages in cache in accordance with a replacement heuristic, and maintaining the remaining node pages in a secondary memory, fetching a node page not in cache from said secondary memory when it is required, and replacing a node page in cache with said fetched node page in accordance with said replacement heuristic, wherein said replacing a node page in cache is in accordance with a least recently used heuristic.

2. A method as in claim 1 including placing more than one node of said tree on a single cache page.

3. A method as in claim 2 including reallocating nodes to a less crowded page when they threaten to overflow a node page.

4. A method as in claim 3 including reallocating nodes to less crowded node pages in a lazy fashion.

5. A method as in claim 3 including, where one of said nodes has several pointers into it, the step of leaving a forwarding address when that node is moved.

6. A method as in claim 1 further comprising the step of updating the count of each transition each time the transition is traversed.

7. A method as in claim 6 further comprising the step of updating the count upon traversing the transition due to accessing of a user page in cache.

8. A method as in claim 6 comprising the step of updating said predictor for fast page requests by incrementing the counts for the user pages accessed at the current node of the prefetcher.

9. A method of prefetching pages into cache by predicting the next page request from a sequence of past page requests using a data compression algorithm, comprising, constructing an online probabilistic model in the form of a parse tree using a data compression algorithm on the sequence of past page requests, said tree having a root, nodes and leafs connected via transitions, constructing a prefetcher comprising a data structure in the form of a tree with a current node, internal nodes and transitions for past page requests between the nodes, wherein transition counts, corresponding to the probabilities established by the parse tree, out of each node to each succeeding node are kept at each node, setting the current node of the prefetcher to be the root of the parse tree, before each user page request, prefetching at most k pages, choosing the pages in decreasing order of the estimated probabilities as determined by the transition counts out of the current node, upon receiving a user page request, updating the transition count for the page requested, resetting the current node to be the node led to by the transition corresponding to the page requested, and preparing to prefetch again, and upon reaching a leaf of the parse tree, an end node of the data structure for which there are no transitions to a further node, immediately resetting the current node of the data structure tree to be the root of the parse tree, using the root for predicting for prefetching and updating the parse tree at both the leaf and root of the parse tree upon receiving the next page request, said step of constructing a prefetcher comprising a data structure includes labeling the transitions between nodes with a user page identifier and a count corresponding to the number of times the transition is traversed, and upon the occurrence of fast page requests by a user, maintaining the current node at its present location and incrementing the count at the current node.

10. A method of prefetching pages into cache by predicting the next page request from a sequence of past page requests using a data compression algorithm, comprising, constructing an online probabilistic model in the form of a parse tree using a data compression algorithm on the sequence of past page requests, said tree having a root, nodes and leafs connected via transitions, constructing a prefetcher comprising a data structure in the form of a tree with a current node, internal nodes and transitions for past page requests between the nodes, wherein transition counts, corresponding to the probabilities established by the parse tree, out of each node to each succeeding node are kept at each node, setting the current node of the prefetcher to be the root of the parse tree, before each user page request, prefetching at most k pages, choosing the pages in decreasing order of the estimated probabilities as determined by the transition counts out of the current node, upon receiving a user page request, updating the transition count for the page requested, resetting the current node to be the node led to by the transition corresponding to the page requested, and preparing to prefetch again, and upon reaching a leaf of the parse tree, an end node of the data structure for which there are no transitions to a further node, immediately resetting the current node of the data structure tree to be the root of the parse tree, using the root for predicting for prefetching and updating the parse tree at both the leaf and root of the parse tree upon receiving the next page request, said step of constructing a prefetcher comprising a data structure includes labeling the transitions between nodes with a user page identifier and a count corresponding to the number of times the transition is traversed, and comprising the step of paging each data structure node.

* * * * *

UNITED STATES PATENT AND TRADEMARK OFFICE
CERTIFICATE OF CORRECTION

PATENT NO. : 5,485,609
DATED : January 16, 1996
INVENTOR(S) : Jeffrey S. Vitter et al.

Page 1 of 2

It is certified that error appears in the above-indentified patent and that said Letters Patent is hereby corrected as shown below:

On the title page:

Item [73] Add to Assignee: Duke University, Durham, North Carolina and Digital Equipment Corporation, Maynard, Massachusetts.

Item [56] References Cited, delete "5,305,389 4/19/94 Palmer.....382/1" (second occurrence).

Under "Other Publications", first column, replace "Laird, A1 Research Branch with --Laird, AI, Research Branch--;

, second column, line 2, replace "Universal Predictionof" with --Universal Prediction of--;

, line 4, replace "Informaiton" with --Information--;
, line 10, replace "Lerans" with --Learns--;
, line 12, replace "225" with -- 255 --.

Column 2, line 41, delete "of" (first occurrence).

UNITED STATES PATENT AND TRADEMARK OFFICE
CERTIFICATE OF CORRECTION

PATENT NO. : 5,485,609
DATED : January 16, 1996
INVENTOR(S) : Jeffrey S. Vitter, et al It is certified that error appears in the above-indentified patent and that said Letters Patent is hereby corrected as shown below:

Column 3, line 15, delete "access";
, line 17, delete "the";
, line 18, replace "till" with --until--;
, line 61, replace "caching" with --prefetching--.

Column 4, line 6, replace "access" with --request--.

Column 5, line 19, before "user" insert --requested--;
, line 56, replace "CAD1" with --CAD--.

Column 6, line 67, replace "leafs" with --leaves--.

Column 8, line 4, replace "leafs" with --leaves--.

Signed and Sealed this

Tenth Day of December, 1996

Attest:

BRUCE LEHMAN

*Attesting Officer*      *Commissioner of Patents and Trademarks*